Sept. 23, 1952 J. W. MYNSSEN 2,611,654
TRANSVERSELY DIVIDED, PLURAL-SECTION DEMOUNTABLE WHEEL-RIM
Filed June 22, 1948 3 Sheets-Sheet 1
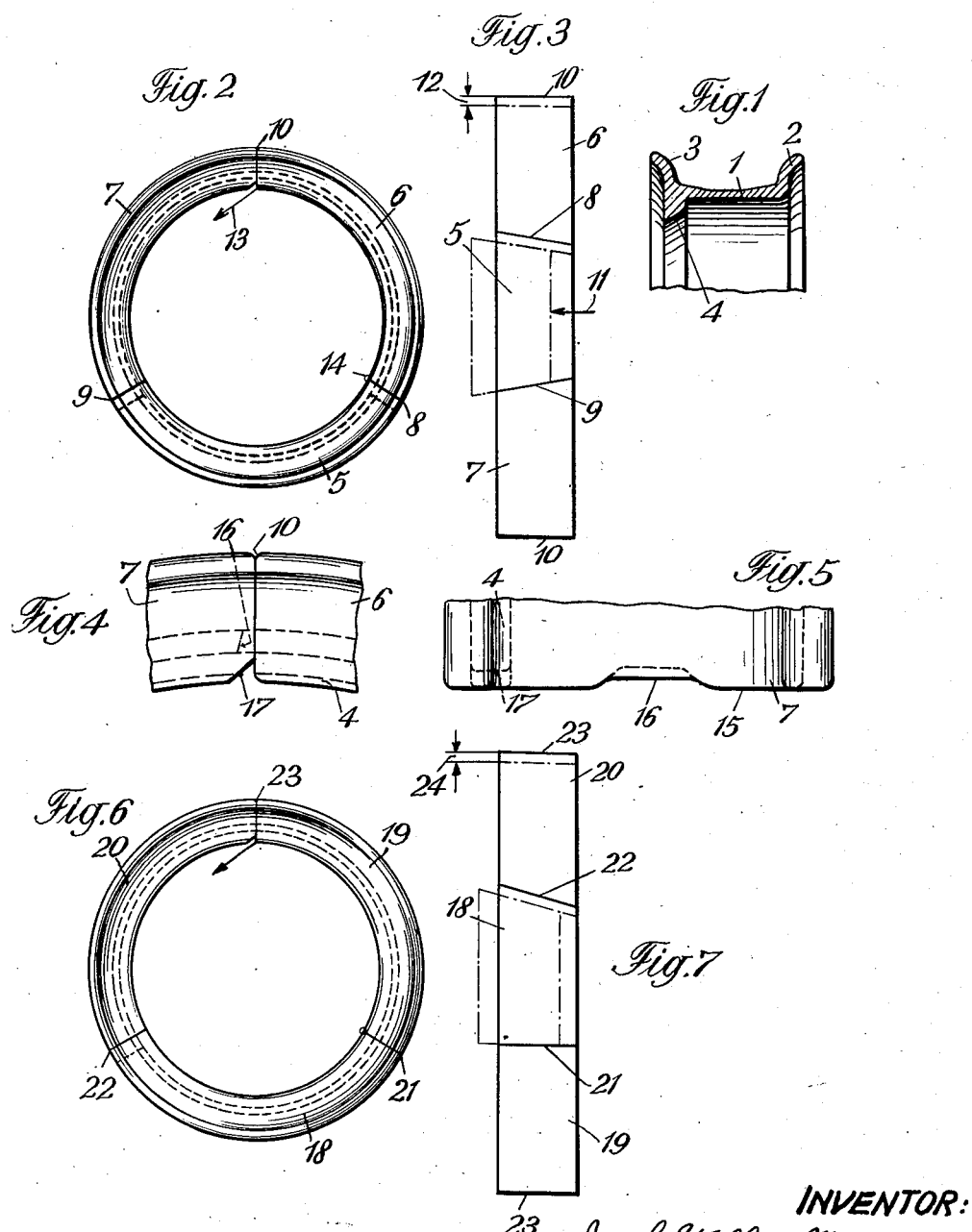
INVENTOR:
Jacob Willem Mynssen
by Sommers & Young
Attorneys

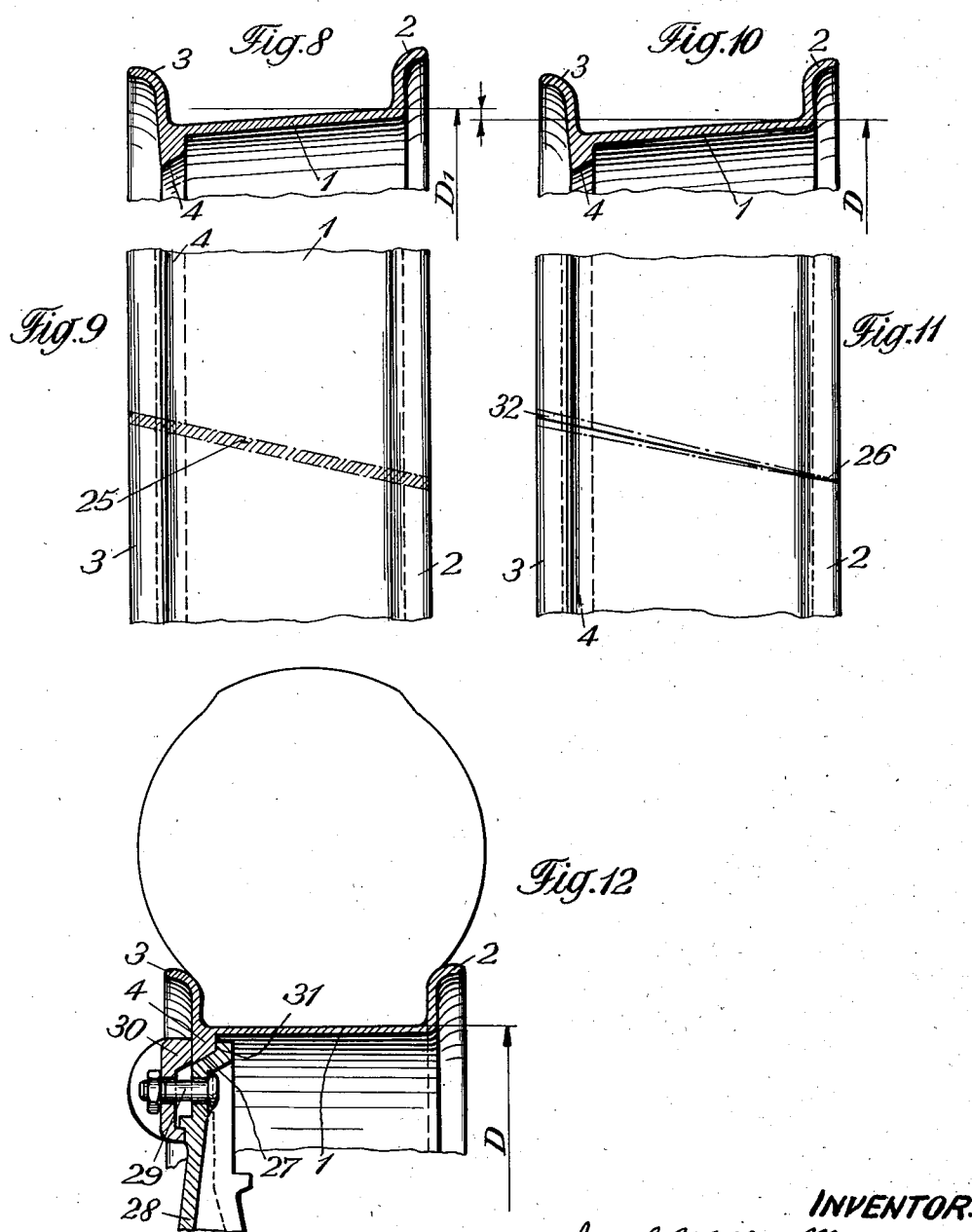

Sept. 23, 1952　　　　J. W. MYNSSEN　　　　2,611,654
TRANSVERSELY DIVIDED, PLURAL-SECTION DEMOUNTABLE WHEEL-RIM
Filed June 22, 1948　　　　　　　　　　　　3 Sheets-Sheet 3
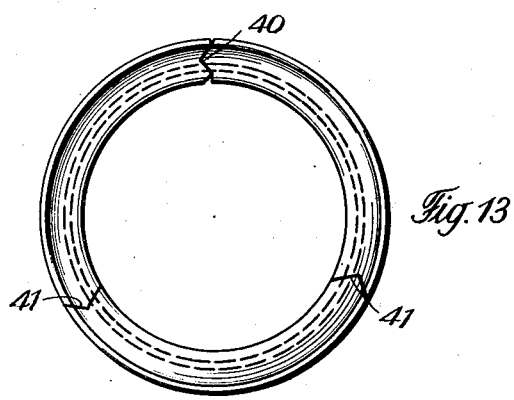
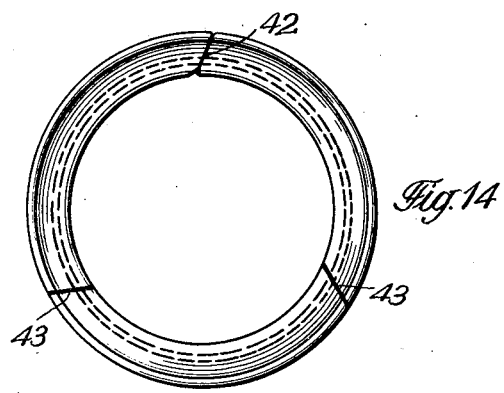
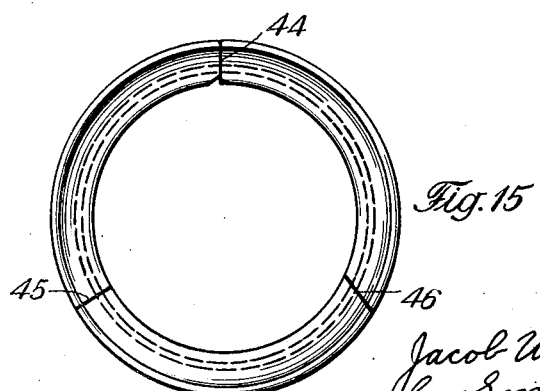
INVENTOR:
Jacob Willem Mynssen
by Sommers & Young
Attorneys Patented Sept. 23, 1952

2,611,654

UNITED STATES PATENT OFFICE 2,611,654

TRANSVERSELY DIVIDED, PLURAL-SECTION DEMOUNTABLE WHEEL-RIM

Jacob Willem Mÿnssen, Schaffhausen, Switzerland, assignor to Georg Fischer Aktiengesellschaft, Schaffhausen, Switzerland Application June 22, 1948, Serial No. 34,475
In Switzerland July 5, 1947

3 Claims. (Cl. 301—31)

My present invention relates to improvements in transversely divided, plural-section demountable rims for vehicle wheels.

A demountable rim of the kind set forth is known in the art, in which the joints of the rim section on the side-flanges of the rim are angularly adapted, in order to obtain an interengagement of the end-faces of the rim sections. Such angular rim section end-faces have to be accurately machined by milling. Such requirement necessitates that each rim section be bent from a straight bar, and then be machined at the end-faces by means of milling cutters. The manufacturing costs of such sections, thus, are relatively high. In other known rim constructions, again, the joints of the sections on the rim side-flanges extend radially. Such latter rim sections may be made, e. g., by cutting an endless ring into a plurality of sections.

Such known rim designs have the disadvantage that the outside diameter of the rim bottom has to be made smaller than the diameter of the bead of a rubber tire which is to be supported by the rim, in order to permit to join the rim sections. The rubber tire, therefore, is only supported by the side-flanges of the rim, as there is a gap between rim bottom and tire bead.

The modern tendency in the design of vehicle wheels is to afford wheel structures in which the tire bead is supported by the rim bottom. In order to satisfy such latter requirement, at least one joint of the section in the rim of the present invention—which comprises at least three sections, and is supported laterally on the wheel body—is so adapted as to extend askew on the rim bottom, in such manner as to shorten the peripheral length of the rim by axially displacing one of the two sections of the respective joint and to permit to abut another rim section hinge-like against the tire bead.

Various forms of my present invention are illustrated in the accompanying drawings, in which Fig. 1 shows a cross-section of a first rim, Fig. 2 an end view of a rim comprising three sections, Fig. 3 schematically a side view of the rim of Fig. 2, in development, Fig. 4 a joint of the rim of Fig. 2, in an end view and larger scale, Fig. 5 a plan view of the end face of one rim section of the joint illustrated in Fig. 4, Fig. 6 an end view of the second form of rim, Fig. 7 a schematical side view and development of the rim of Fig. 6, Fig. 8 a cross-section of a fragment of a rim adapted as endless conical ring, Fig. 9 a top plan view of a fragment of the rim of Fig. 8, Fig. 10 a cross-section of a fragment of a rim cut up into sections, Fig. 11 a top plan view of a fragment of the sectional rim of Fig. 10, Fig. 12 a cross-section of a sectional rim mounted on a wheel body and carrying a rubber tire, Fig. 13 an elevation of a further form of invention, Fig. 14 an elevation of a still further form of invention, Fig. 15 an elevation of a last form of invention.

The rim according to my present invention is of integral cross-section (Fig. 1), i. e. the rim bottom 1 and the two side-flanges 2, 3 are made of one piece. The radially inner edge of flange 3 is beveled at 4 to form a seat on a correspondingly adapted wheel body.

The rim shown in Figs. 2, 3 comprises three sections 5—7. The joints 8—10 of the latter extend radially on the side-flanges of the rim. The adjacent joints 8, 9 extend askew on the rim bottom 1, but in opposite directions. By displacing the tapered section 5 (Fig. 3) in direction of the arrow 11 (into a position shown by the dash-and-dot lines) the peripheral length of the rim is shortened by a certain amount 12 (Fig. 3).

The rim sections are assembled to an entire ring inside the bead of a rubber tire, by abutting the sections 5 and 7 radially against the said bead. The section 6 then is inserted into the tire so that the segment end-face appurtenant to the joint 8 abuts against the adjacent end-face of the section 5. A prerequisite for such procedure, however, is that the end of section 6, which belongs to the joint 10, has been moved beforehand toward the center of the rim, as shown by the arrow 13 in Fig. 2. The ends of the sections 6, 7, which form the joint 10, overlap in the position described of the section 6. In order to eliminate such overlap, the section 5 is displaced transversely (see arrow 11 in Fig. 3) so that the peripheral length of the rim is shortened and the section 6 may swing about the point 14 of joint 8 into the position shown in Fig. 2 in which the three sections form a full ring. The section 5, now, is displaced laterally in a direction opposite to that of arrow 11 until it is alined in the same direction as the sections 6 and 7, whereby the peripheral length of the rim is increased and the rim bottom 1 abuts against the bead of the rubber tire. A recess 16 is provided in the rim bottom of the end-face 15 of section 7 appurtenant to joint 10. A lever-like tool is insertable into the said recess and actuatable to impart a swinging movement to the end of section 6 adjacent the joint 10. The rim seat 4 of section 7 is chamfer at the end adjacent the joint 10, such chamfer being designated by 17 in Figs. 4 and 5.

In the second form (Figs. 6, 7), the rim comprises three sections 18–20. The joints 21–23 of the latter extend radially on the rim side-flanges. The joint 22 runs askew on the rim bottom, whereas the joints 21, 23 run parallel to the axial direction of the wheel. The section 18 in development forms a wedge having a one-side taper. By displacing the section 18 into the position shown by dash-and-dot lines in Fig. 7, the peripheral length of the rim is decreased, as shown at 24.

In place of the joints running radially on the side-flanges of the rim, differently adapted joints also could be used, e. g. angularly disposed joints such as 40, 41 in Fig. 13, or rectilinear joints 42, 43 (Fig. 14) deviating from the radial direction. In the case of rectilinear joints, two joints also could be radially arranged, and the third joint at an angle to the radial direction, as shown in Fig. 15 at 44–46. Obviously, arrangements also are possible which comprise more than three sections.

A very convenient method of manufacturing the rim section consists in making an integral oversize rim having a conical bottom, i. e. the diameter ($D_1$ in Fig. 8) of the latter on the rim-side opposite to the rim seat 4 is greater than the diameter on the side of seat 4. The rim then is subdivided by a material-removing cutting-operation such as milling, scraping out, slotting, broaching, sawing, into sections. In Fig. 9, a sawing cut 25 which runs askew on the rim bottom, is shown by dash-and-dot lines and the shaded portion. The peripheral length of the rim is shortened by such sawing cuts, to such amount that the resulting rim sections upon assembly will form a rim which has a diameter D—corresponding to the diameter of the tire bead—on the outer circumference of the rim bottom on the side opposite to the rim seat 4. In place of the sawing cut 25, there now is the joint 26. When the rim, by means of its conical seat 4, is mounted onto the conical seat 27 of the wheel body 28—which may be brought about by means of the bolts 29 anchored to the wheel body 28 in combination with the clamping lugs 30—the rim is widened on the side of the rim seat 4 until the rim bottom 1 will be of cylindrical shape and the rear face 31 of seat 4 will abut against a face provided on the wheel body 28. A tapered gap 32 of approximately two millimeters width, open on the side of rim-seat 4, is formed at the joint 26 when the rim-bottom is transformed into the cylindrical configuration, which gap is indicated in Fig. 11 by dash-and-dot lines.

In Figs. 8 and 10, the taper of the rim-bottom 1 relative to the wheel axle, is shown exaggerated for the sake of clarity.

When the tapered endless rim is to be divided into sections by means of shearing cuts, the endless rim is made with a diameter D (Fig. 10).

The rim sections also may be made as castings, e. g. of light metal alloys, which upon assembly produce an entire rim, in accord with the diameter D in Fig. 10.

What I claim as new and desire to secure by Letters Patent, is:

1. A wheel rim structure consisting of a plurality of independent sections, each section having a rim bottom and two opposed rim flanges integral with the rim bottom, the sections contacting by means of straight butt joints and one at least of said butt joints extending askew of the rim bottom and the rim flanges whereby axial displacement of one of the two sections of said joint relatively to the other section results in shortening the peripheral length of the rim and permits one of the other sections to be pivoted away from the bead of a rubber tire to be mounted on the rim.

2. A wheel rim structure consisting of a plurality of independent sections of substantially equal length, each section having a rim bottom and two opposed rim flanges integral with the rim bottom, successive sections contacting each other by means of straight butt joints and one at least of said butt joints extending askew of the rim bottom and the rim flanges, whereby axial displacement of one of the two sections of said joint relatively to the other section results in shortening the peripheral length of the rim.

3. A wheel rim structure consisting of a plurality of independent sections of substantially equal length, each section having a rim bottom and two opposed rim flanges integral with the rim bottom, successive sections contacting each other by means of straight butt joints, two consecutive joints extending askew of the rim bottom and the rim flanges and in oppositely inclined direction, whereby axial displacement of the rim section between said two butt joints results in decreasing the peripheral length of the rim.

JACOB WILLEM MŸNSSEN.

REFERENCES CITED

The following references are of record in the file of this patent:

UNITED STATES PATENTS

| Number | Name | Date |
|---|---|---|
| 1,204,019 | Hopkinson | Nov. 7, 1916 |
| 1,290,556 | St. Hilaire | Jan. 7, 1919 |
| 1,326,418 | Peters | Dec. 30, 1919 |
| 1,626,284 | Johnson | Apr. 26, 1927 |
| 1,691,491 | Nelson | Nov. 13, 1928 |
| 1,846,118 | Klaus | Feb. 23, 1932 |
| 1,860,308 | Conti | May 24, 1932 |
| 2,065,866 | Mijnssen | Dec. 29, 1936 |